United States Patent [19]

Yotsutani et al.

[11] Patent Number: 4,843,622

[45] Date of Patent: Jun. 27, 1989

[54] COMMUNICATION CONTROL SYSTEM CAPABLE OF SEARCHING A CALLED TELEPHONE SET IN A MOBILE RADIO TELEPHONE NETWORK

[75] Inventors: Akio Yotsutani; Yukihiro Sako, both of Tokyo; Toshihiko Shibata; Yoshitoshi Murata, both of Kanagawa, all of Japan

[73] Assignees: NEC Corporation; Kabushiki Kaisha Toshiba; Matsushita Communication Industrial Co., Ltd.; Nippon Telegraph and Telephone Corporation, Japan

[21] Appl. No.: 177,272

[22] Filed: Apr. 4, 1988

[30] Foreign Application Priority Data

Apr. 3, 1987 [JP] Japan .................. 62-83591

[51] Int. Cl.$^4$ .............................. H01Q 7/04
[52] U.S. Cl. ........................ 379/59; 379/57; 379/63
[58] Field of Search ........... 379/60, 59, 61, 58; 455/33; 340/825.44

[56] References Cited

U.S. PATENT DOCUMENTS

| | | | |
|---|---|---|---|
| 4,187,398 | 2/1980 | Stark | 379/59 |
| 4,233,473 | 11/1980 | Frost | 379/59 |
| 4,644,351 | 2/1987 | Zabarsky et al. | 340/825.44 |
| 4,646,345 | 2/1987 | Zouner et al. | 379/62 |
| 4,649,385 | 3/1987 | Aires et al. | 379/57 |
| 4,658,416 | 4/1987 | Tanaka | 379/57 |
| 4,661,972 | 4/1987 | Kai | 379/57 |
| 4,680,785 | 7/1987 | Akiyama et al. | 379/57 |
| 4,737,977 | 4/1988 | Norman | 379/58 |
| 4,740,788 | 4/1988 | Konneker | 340/825.44 |
| 4,747,122 | 5/1988 | Bhagat et al. | 379/57 |
| 4,748,655 | 5/1988 | Thrower et al. | 379/60 |
| 4,754,473 | 6/1988 | Edwards | 379/58 |
| 4,775,999 | 10/1988 | Williams | 379/59 |

Primary Examiner—Robert Lev
Attorney, Agent, or Firm—Sughrue, Mion, Zinn, Macpeak and Seas

[57] ABSTRACT

For use in a mobile radio telephone network including radio telephone sets movable in an area divided into a predetermined number of zones, a communication control system includes a searching arrangement (25, 33) for searching one (15') of radio communication devices of the network as a searched communication device that is assigned to a present one of the zones into which a specific one (11') of the radio telephone sets has moved from a previous one of the zones. For operation of the searching arrangement, a communicating arrangement (22, 25, 32) of the system sends a call signal to a specific one of the radio communication devices that is assigned to the previous zone to transmit the call signal to the specific telephone set and receives a response signal transmitted from the specific telephone set if the specific telephone set were in the previous zone. For the communicating arrangement, a selecting arrangement (21, 25, 31) selects the specific communication device with reference to a memory (27) for memorizing, in correspondence to the radio telephone sets, location information indicative of the radio communication devices assigned to the zones in which the radio telephone sets are present at a time. The searching arrangement preferably updates the memory to make the information indicate the searched communication device instead of the specific communication device.

4 Claims, 15 Drawing Sheets

COMMUNICATION CONTROL SYSTEM CAPABLE OF SEARCHING A CALLED TELEPHONE SET IN A MOBILE RADIO TELEPHONE NETWORK

BACKGROUND OF THE INVENTION

This invention relates to a communication control system for use in a mobile radio telephone network.

A mobile radio telephone network of the type described, generally comprises a telephone line and a plurality of radio telephone sets. The radio telephone sets are movable in an area which is divided into a predetermined number of zones.

For the time being, it will be presumed that the area is within limits of a factory or in a head office of a corporation. In this case, the telephone line is a collection of subscriber lines extended from a central office to a private branch exchange of the factory or the head office. Alternatively, the telephone line is a collection of extension lines which are extended from the private branch exchange. Each radio telephone set may be a cordless telephone set.

A plurality of radio communication devices are assigned to the respective zones. It will be supposed merely for brevity of description that all radio telephone sets are alive, namely, capable of always carrying out communication, and are moving among the zones. Some of the radio telephone sets can use the radio communication device assigned to the zone in which the radio telephone sets in question are present at a time.

Between the telephone line and the radio communication devices, a control unit is connected to control communication between the telephone line and the radio communication devices. The control unit serves as a communication control system to which the present invention is directed.

A conventional communication control system has been considered by the assignees of the instant invention and includes a memory for memorizing, in correspondence to the radio telephone sets, location information signals indicative of the radio communication devices assigned to the zones in which the radio telephone sets are present at a time. Thus, the memory is used in memorizing the location information signals as a content of the memory.

When an arrival signal arrives at the telephone line to specify a specific or called telephone set among the radio telephone sets, the control unit selects one of the radio communication devices as a specific communication device with reference to the content of the memory. This one of the radio communication devices is indicated by one of the location information signals that is in correspondence to the specific telephone set. Then, the control unit sends the arrival signal as a call signal to the specific communication device for transmission to the specific telephone set. Responsive to the call signal, the specific telephone set transmits a response signal to the specific communication device for reception by the control unit when the specific telephone set is present in one of the zones that is assigned with the specific communication device.

When the specific telephone set is not present in the above-mentioned one of the zones, the specific telephone set can not receive the call signal. Therefore, the control unit can not receive the response signal. More specifically, the control unit can not receive the response signal when the specific telephone set moves from the above-mentioned one of the zones to a different one of the zones. It should be understood in this connection that the location information signal for the specific telephone set is kept untouched in the memory to indicate the specific communication device. When the control unit can not receive the response signal within a predetermined time after transmission of the call signal towards the specific telephone set, the control unit judges that the specific telephone set is out of position. At any rate, the conventional communication control system is incapable of transmitting the call signal to the specific telephone set when the specific telephone set is not present in one of the zones that is assigned with the specific communication device indicated by the location information signals.

SUMMARY OF THE INVENTION

It is therefore an object of this invention to provide a communication control system which is capable of transmitting a call signal to a called telephone set without fail.

It is another object of this invention to provide a communication control system of the type described, which is for use in a mobile radio telephone network covering an area divided into a plurality of zones in accessing a called telephone set moving among the zones.

Other objects of this invention will become clear as the description proceeds.

On describing the gist of this invention, it is possible to understand that a communication control system is for use in a mobile radio telephone network comprising a telephone line, a plurality of radio telephone set movable in an area divided into a predetermined number of zones, and a plurality of radio communication devices assigned to the respective zones.

According to this invention, the communication control system includes: a memory for memorizing, in correspondence to the radio telephone sets, location information signals indicative of the radio communication devices assigned to the zones in which the radio telephone sets ar present at a time; selecting means coupled to the telephone line and the memory for selecting, in response to an arrival signal arriving at the telephone line and specifying a specific telephone set among the radio telephone sets, one of the radio communication devices as a specific communication device that is indicated by one of the location information signals that, in turn, is in correspondence to the specific telephone set; and communicating means coupled to the radio communication devices and the selecting means for sending the arrival signal as a call signal to the specific communication device for transmission to the specific telephone set. Responsive to the call signal, the specific telephone set transmits a response signal to the specific communication device for reception by the communicating means when the specific telephone set is present in one of the zones that is assigned with the specific communication device. The communication control system further comprises searching means coupled to the radio communication devices and the communicating means for searching a different one of the radio communication devices as a searched communication device by transmitting, if the communicating means does not receive the response signal, the call signal to the radio communication devices in a predetermined manner until the communicating means receives the response signal through the searched communication device.

DESCRIPTION OF THE PREFERRED EMBODIMENT

Figure 1:
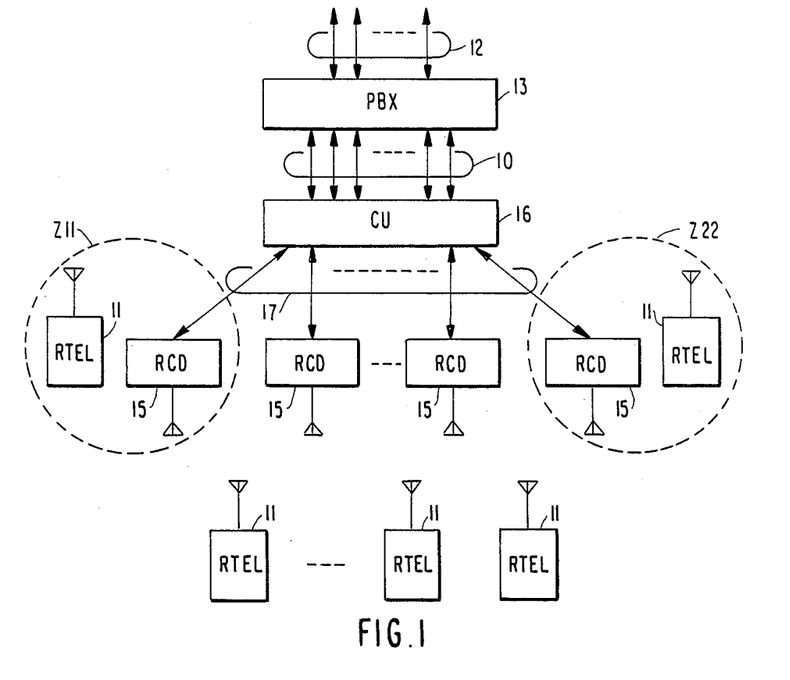
FIG. 1 is a block diagram of a mobile telephone network comprising a communication control system according to an embodiment of this invention.

Referring to FIG. 1, a communication control system according to a preferred embodiment of this invention is for use in a mobile radio telephone network. The mobile radio telephone network comprises a plurality of telephone lines 10 and a plurality of radio or cordless telephone sets 11. Each of the radio telephone sets 11 is labelled "RTEL" and has a telephone number specific to the radio telephone set 11 in question.

In the example being illustrated, the telephone lines 10 are extension lines which are connected to a plurality of subscriber lines 12 through a private branch exchange 13 labelled "PBX". The radio telephone sets 11 are in correspondence to the respective extension lines 10 and are therefore specified by the respective extension lines 10.

Figure 2:
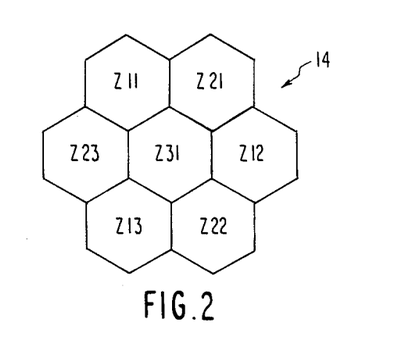
FIG. 2 shows a service area of the mobile radio telephone network illustrated in FIG. 1.

Turning to FIG. 2 for a short while, each of the radio telephone sets 11 is movable in a service area 14 which is divided into a predetermined number of zones labelled "Z11", "Z12", "Z13", "Z21", "Z22", "Z23", and "Z31". In the example being illustrated, the predetermined number is equal to seven. The service area is, for example, within limits of a factory.

Turning back to FIG. 1, a plurality of radio communication devices 15 are assigned to the respective zones Z (suffixes omitted). Each of the radio communication devices 15 is labelled "RCD" and has a device number specific to the radio communication device 15 in question.

A control unit 16 is labelled "CU" and is connected to the extension lines 10 and to the radio communication devices 15 through a plurality of connection lines 17 to control communication between on of the extension lines 10 and one of the radio communication devices 15. The control unit 16 is used as the communication control system according to the embodiment of this invention.

Figure 3:
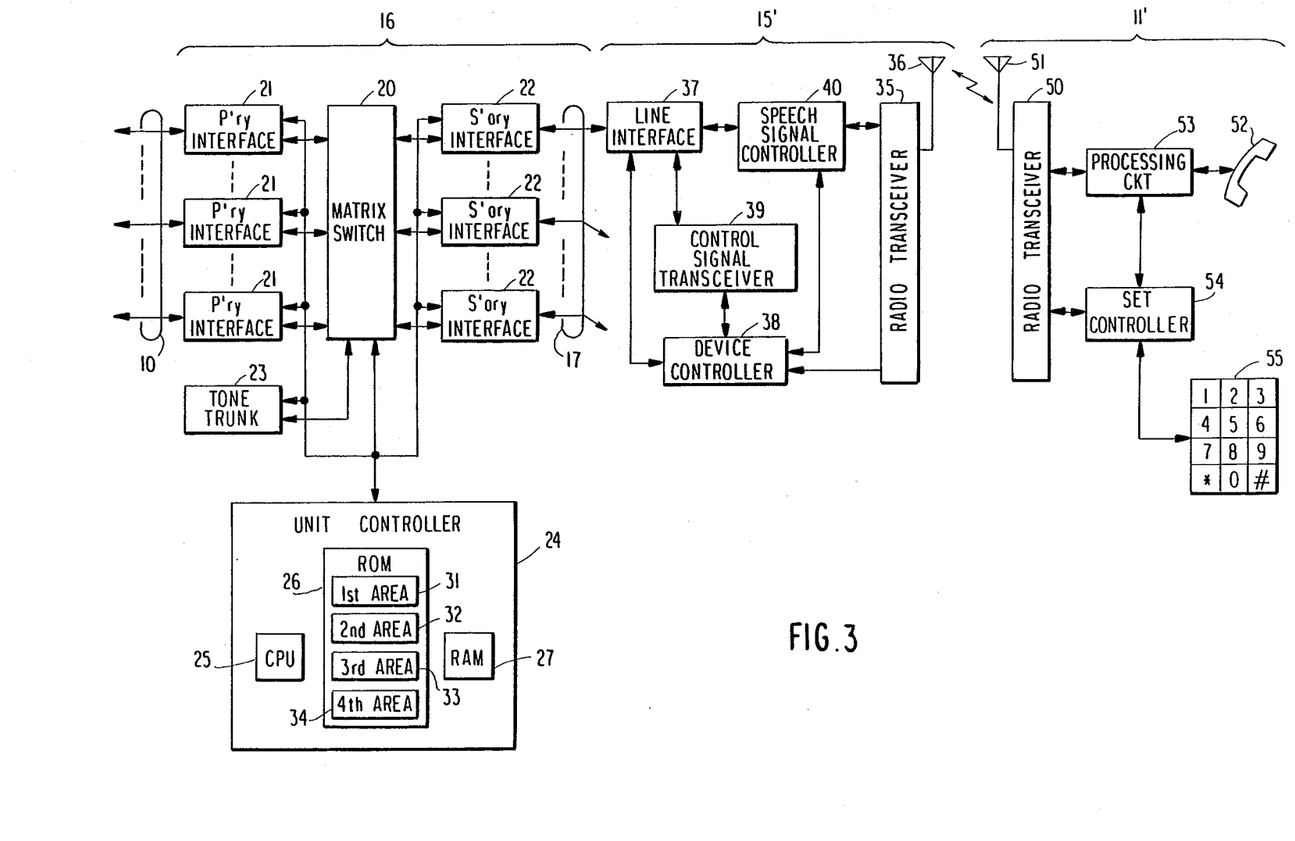
FIG. 3 is a block diagram of a control unit, one of radio communication devices, and one of radio telephone sets in the mobile radio telephone network illustrated in FIG. 1.

Referring to FIG. 3, the control unit 16 comprises a matrix switch 20, a plurality of primary interfaces 21 between the respective extension lines 10 and the matrix switch 20, and a plurality of secondary interfaces 22 between the matrix switch 20 and the respective connection lines 17. Each of the primary interfaces 21 is operable as an interface for use in connecting each of the extension lines 10 to the matrix switch 20. Each of the secondary interfaces 22 is operable as another interface for use in connecting each of the connection lines 17 to the matrix switch 20. Each of the connection lines 17 is a two-wired transmission line. A tone trunk 23 is connected to the primary interfaces 21, to the secondary interfaces 22, and to the matrix switch 20 for generating various tone signals, such as a call tone signal and other tone signals.

A unit controller 24 is connected to the primary interfaces 21 and to the secondary interfaces 22 for controlling operation of the matrix switch 20. The unit controller 24 comprises a CPU (central processing unit) 25, an ROM (read only memory) 26, and an RAM (random access memory) 27. The matrix switch 20 connects one of the primary interfaces 21 and one of the secondary interfaces 22 under the control of the CPU 25.

The ROM 26 has first, second, third, and fourth areas 31, 32, 33, and 34. The first area 31 is for memorizing an arrival signal detecting operation program. The second area 32 is for memorizing an incoming call signal sending operation program while the third area 33 is for memorizing searching and updating operation programs. The fourth area 34 is for memorizing other operation programs to make the CPU 25 execute various operations. The arrival signal detecting operation program, the incoming call signal sending operation program, the searching and the updating operation programs, and other operation programs will become clear as the description proceeds.

Figure 4:
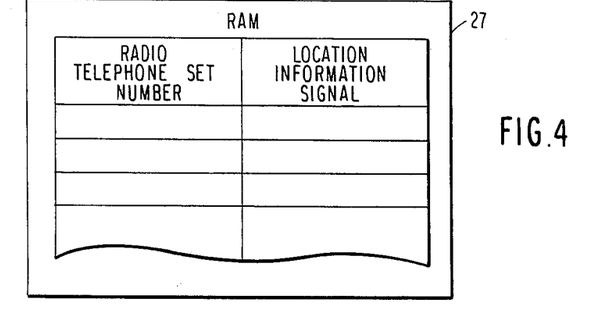
FIG. 4 is a diagram for use in describing operation of an RAM which is preferably used in the communication control system of the mobile radio telephone network illustrated in FIG. 1.

Turning temporarily to FIG. 4, the RAM 27 is for memorizing, in correspondence to the radio telephone sets 11, location information signals indicative of the radio communication devices 15 assigned to the zones in which the radio telephone sets 11 are present at a time. More specifically, the location information signals are memorized in correspondence to the telephone numbers of the radio telephone sets 11 to indicate the device numbers of the radio communication devices 15 assigned to the zones in which the radio telephone sets 11 are present.

Turning back to FIG. 3, the control unit 16 sends, in response to an arrival signal arriving at one of the extension lines 10, an incoming call signal to one of the radio telephone sets 11 that is specified as a specific telephone set by the above-mentioned one of the extension lines 10. The incoming call signal comprises the call tone signal and a number signal representative of the telephone number of the specific telephone set.

More particularly, the CPU 25 of the unit controller 24 of the control unit 16 detects the arrival signal received from the above-mentioned one of the extension lines 10 through one of the primary interfaces 21. The CPU 25 thereafter selects one of the radio telephone sets 11 as a specific telephone set that is specified by the above-mentioned one of the extension lines 10. The CPU 25 furthermore selects, with reference to the location information signals memorized in the RAM 27, one of the radio communication devices 15 as a specific communication device.

In this event, the above-mentioned one of the radio communication devices 15 is indicated by one of the location information signals that is in correspondence to the specific telephone set. The CPU 25 executes the arrival signal detecting operation program memorized in the first area 31 of the ROM 26 to carry out such operation of detecting the arrival signal and of selecting the specific telephone set and the specific communication device. Thus, a combination of the first interfaces 21, the first area 31 of the ROM 26, and the CPU 25 serves as a selecting arrangement coupled to the telephone lines 10 and the RAM 27 for selecting, in response to an arrival signal arriving at one of the telephone lines 10 and specifying a specific telephone set among the radio telephone sets 11, one of the radio communication devices 15 as a specific communication device that is indicated by one of the location information signals that, in turn, is in correspondence to the specific telephone set.

The CPU 25 furthermore makes the tone trunk 23 generate the call tone signal and sends the arrival signal to the specific communication device as the incoming call signal which comprises the call tone signal and the number signal representative of the specific telephone set. The incoming signal is sent to the specific communication device through a corresponding one of the secondary interfaces 22 for transmission to the specific telephone set.

Following execution of the arrival signal detecting operation program, the CPU 25 executes the incoming call signal sending operation program memorized in the second area 32 of the ROM 26 to carry out such operation of sending the incoming call signal to the specific communication device. Thus, a combination of the secondary interfaces 22, the second area 32 of the ROM 26, and the CPU 25 serves as a communicating arrangement coupled to the radio communication devices 15 and the selecting arrangement for sending the arrival signal as the incoming call signal to the specific communication device for transmission to the specific telephone set.

In FIG. 3, attention will be directed to one of the radio communication devices 15 that is illustrated at 15'. The illustrated radio communication device 15' comprises a radio transceiver 35 of a multichannel access system for carrying out radio communication with one of the radio telephone sets 11 through a communication device antenna 36. It should be understood that each of other radio communication devices 15 has a structure similar to the illustrated radio communication device 15'.

The multichannel access system comprises a control channel and a prescribed number of speech or other communication channels. The control and the communication channels are of different radio frequencies and are shared by the radio communication devices 15 and the radio telephone sets 11.

The control channel is for use in transmitting a control signal between the radio communication device 15' and one of the radio telephone sets 11. It should be understood that a like control channel may simultaneously be used between a different one of the radio communication devices 15 and the radio telephone sets which are present in the zone assigned with the different communication device. The control signal is, for example, the incoming call signal, an outgoing call signal, a response signal, or a location registration signal. The outgoing call, the response, and the location registration signals will become clear as the description proceeds. The control channel is divided into a downward control channel of, for example, 380 MHz and an upward control channel of, for example, 250 MHz. The incoming call signal is transmitted from the radio communication device 15' towards the radio telephone sets 11 by the use of the downward control channel. Each of the outgoing call, the response, and the location registration signals is transmitted from each of the radio telephone sets 11 towards the radio communication device 15' by the use of the upward control channel.

Each of the communication channels is for use in transmitting a speech signal and other communication signals. Each of the communication channels is divided into a downward communication channel and an upward communication channel. By the use of the downward communication channel, the speech signal is transmitted from the radio communication device 15' towards the radio telephone sets 11. By the use of the upward communication channel, the speech signal is transmitted from each of the radio telephone sets 11 towards the radio communication device 15'.

A line interface 37 is connected to a corresponding one of the connection lines 17. A device controller 38 is connected to the line interface 37 through a control signal transceiver 39 and directly to the line interface 37. The device controller 38 is furthermore connected to the radio transceiver 35. The device controller 38 comprises a CPU (not shown), an ROM (not shown) for memorizing an execution program for the CPU, and an RAM (not shown) which serves as a working area for the CPU.

Responsive to the control signal received through the radio transceiver 35, the device controller 38 controls delivery of the control signal to the control signal transceiver 39. Upon reception of the control signal, the control signal transceiver 39 supplies the control signal to the line interface 37. The line interface 37 delivers the control signal to the connection line 17 under the control of the device controller 38. When the line interface 37 receives the control signal through the connection line 17 in question, the control signal is transmitted to the radio transceiver 35 through the control signal transceiver 39 and the device controller 38.

A speech signal controller 40 is connected between the radio transceiver 35 and the line interface 37 and to the device controller 38 for carrying out, under the control of the device controller 38, on-off control of the speech signal received through one of the radio transceiver 35 and the line interface 37 to produce an on-off controlled signal. The speech signal controller 40 is furthermore for amplifying the on-off controlled signal to produce an amplified signal which is supplied to another of the radio transceiver 35 and the line interface 37. Such operation of the speech signal controller 40 is known in the art.

Supposing that the illustrated radio communication device 15' is the above-mentioned specific radio communication device, the device controller 38 of the radio communication device 15' receives the incoming call signal through the line interface 37 and the control signal transceiver 39. Thereafter, the device controller 38 gives the incoming call signal to the radio transceiver 35 to make the radio transceiver 35 transmit the incoming call signal to the specific radio telephone set by the use of the downward control channel.

Continuing reference to FIG. 3, description will proceed to one of the radio telephone sets 11 that is illustrated at 11'. Each of other radio telephone sets 11 is similar in structure and operation.

The illustrated radio telephone set 11' comprises a radio transceiver 50 of the multichannel access system for carrying out radio communication with one of the radio communication devices 15 through a telephone set antenna 51. It will be surmised that this one of the radio communication device is the illustrated radio communication device 15'. The radio transceiver 50 is similar to the radio transceiver 35 of the radio communication device 15' and is operable in the similar manner. A handset unit 52 is connected to the radio transceiver 50 through a processing circuit 53 and has a set (not shown) of receiver and microphone. A set controller 54 is connected to the radio transceiver 50 and to the processing circuit 53 to control the radio transceiver 50 and the processing circuit 53.

The processing circuit 53 carries out an amplifying operation for amplifying the speech signal received through the radio transceiver 50 to send an amplified speech signal to the receiver of the handset unit 52. The processing circuit 53 further carries out another amplifying operation for amplifying the speech signal received through the microphone to send another amplified speech signal to the radio transceiver 50. The processing circuit 53 furthermore carries out, under the control of the set controller 54, on-off control of the speech signal received through the radio transceiver 50 to produce an on-off controlled speech signal for supply to the receiver of the handset unit 52. Likewise, the processing circuit 53 carries out, under the control of the set controller 54, on-off control of the speech signal received from the microphone of the handset unit 52 to produce another on-off controlled speech signal for delivery to the radio transceiver 50.

A dialing key 55 is connected to the set controller 54. The dialing key 55 is for generating a dialing signal representative of either one of other radio telephone sets 11 or on of subscriber telephone sets (not shown) connected through one of the subscriber lines 12 (FIG. 1) to supply the dialing signal to the set controller 54.

The set controller 54 comprises a CPU (not shown), an ROM (not shown) for memorizing an execution program for the CPU, and an RAM (not shown) operable as a working area for the CPU like the device controller 38. The ROM of the set controller 54 furthermore memorizes a telephone number signal representative of the telephone number which is assigned to the illustrated radio telephone set 11'. On reception of the dialing signal, the CPU of the set controller 54 produces an outgoing call signal which comprises the dialing signal and the telephone number signal for the illustrated radio telephone set 11'. Responsive to the outgoing call signal, the radio transceiver 50 transmits the outgoing call signal towards the radio communication device 15' by the use of the control channel.

It will be assumed that the illustrated radio telephone set 11' is present at a certain instant of time in the zone assigned with the specific communication device and that the specific communication device is the illustrated radio communication device 15'. In this case, the radio telephone set 11' receives the incoming call signal through the control channel. When the incoming call signal is received through the radio transceiver 50, the CPU of the set controller 54 judges whether or not the number signal of the incoming call signal coincides with the number signal memorized in the ROM of the set controller 54. In other words, the CPU of the set controller 54 judges whether or not the radio telephone set 11' is the above-mentioned specific telephone set. If the former number signal coincides with the latter number signal, the radio telephone set 11' is the specific telephone set without fail. Only when the former and the latter number signals coincide with each other, the CPU of the set controller 54 makes a combination of the processing circuit 53 and the receiver of the handset unit 52 process the call tone signal into a call tone or sound. When the handset unit 52 is put into an off-hook state by an operator of the radio telephone set 11', the CPU of the set controller 54 of the radio telephone set 11' transmits a response signal through the control channel to the specific communication device 15' for reception by the communicating arrangement (namely, the secondary interfaces 22 and the CPU 25) of the control unit 16.

In this manner, the specific telephone set transmits the response signal to the specific communication device 15' in response to the call signal for reception by the communication arrangement when the specific telephone set is present in one of the zones that is assigned with the specific communication device 15'. Responsive to the response signal, the device controller 38 of the specific communication device 15' transmits, by the use of the control channel, to the specific telephone set a channel informing signal representative of an idle channel selected among the communication channels in the manner known in the art.

When the CPU 25 of the control unit 16 receives the response signal through the secondary interface 22 connected to the specific communication device 15', the CPU 25 makes the matrix switch 20 connect the secondary interface 22 in question to the primary interface 21 through which the CPU 25 receives the arrival signal. In this manner, the specific telephone set can start communication with a calling telephone set through the above-mentioned one of the extension lines 10 by the use of the idle channel.

If the CPU 25 of the control unit 16 can not receive the response signal through the secondary interface 22 in question within a predetermined time after transmission of the incoming call signal towards the specific telephone set, the CPU 25 executes the searching operation program memorized in the third area 33 of the ROM 26. In this event, the CPU 25 searches a different one of the radio communication devices 15 as a searched communication device by transmitting the incoming call signal to the radio communication devices 15 in a predetermined manner until the response signal is received by one of the secondary interfaces 22 through the searched communication device.

Following execution of the searching operation program, the CPU 25 executes the updating operation program which is also memorized in the third area 33 of the ROM 26. In this instance, the CPU 25 updates the RAM 27 to make the location information signal corresponding to the specific telephone set indicate the searched communication device instead of the specific communication device.

Thus, a combination of the third area 33 of the ROM 26 and the CPU 25 serves as a searching arrangement coupled to the radio communication devices 15 and the communicating arrangement for searching a different one of the radio communication devices 15 as a searched communication device by transmitting, if the communicating arrangement does not receive the response signal, the call signal to the radio communication devices 15 in a predetermined manner until the communicating arrangement receives the response signal through the searched communication device. The combination of the third area 33 and the CPU 25 is furthermore for updating the RAM 27 to make the location information signal corresponding to the specific telephone set indicate the searched communication device instead of the specific communication device 15'.

Figure 5:
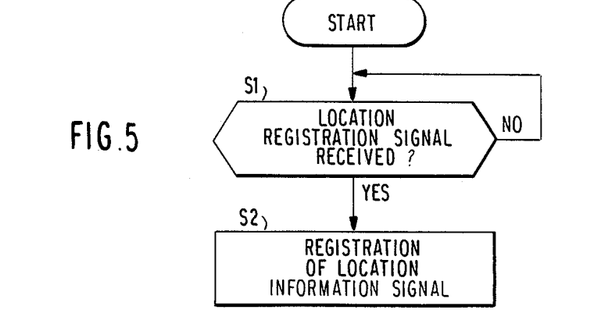
FIGS. 5, 6, 7, and 8 are flow charts for use in describing various operations of the communication control system of the mobile radio telephone network illustrated in FIG. 1.

Turning to FIG. 5 with reference to FIG. 3 continued, description will proceed to a registration operation of registering the location information signal in the RAM 27.

It will be supposed that the illustrated radio telephone set 11' is present in the zone assigned to the illustrated radio communication device 15' and that the radio telephone set 11' transmits a location registration signal to the radio communication device 15' by the use of the control channel. The location registration signal comprises a registration informing signal indicative of a location registration operation and the number signal representative of the telephone number of the radio telephone set 11'.

On reception of the location registration signal, the radio communication device 15' delivers the location registration signal to the unit controller 24 of the control unit 16. The CPU 25 of the unit controller 24 carries out judgement whether or not the location registration signal is received with reference to the registration informing signal at a first stage S1. In this event, the CPU 25 judges that the location registration signal is received when the CPU 25 detects the registration informing signal. A result of the judgement is affirmative, operation proceeds to a second stage S2. Otherwise, operation turns back to the first stage S1.

At the second stage S2, the CPU 25 carries out registration operation of registering a location information signal in the RAM 27 in correspondence to the number signal included in the location registration signal. The location information signal indicates the radio communication device through which the CPU 25 receives the location registration signal.

It will be assumed that the CPU 25 receives the location registration signals comprising the number signals representative of the same telephone number in common through at least two of the radio communication devices 15. In this case, the CPU 25 carries out the following operation at the second stage S2. The CPU 25 detects, among the location registration signals, the location registration signal having the largest field strength. Thereafter, the CPU 25 registers in the RAM 27 a location information signal indicative of the radio communication device through which the CPU 25 receives the location registration signal having the largest field strength.

In order to carry out the above-mentioned registration operation, the CPU 25 executes a registration operation program memorized in a part (not shown) of the fourth area 34 of the ROM 26.

Figure 6:
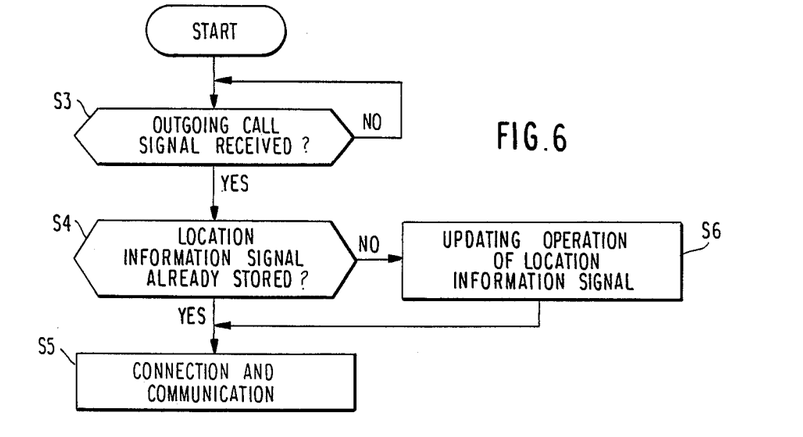

Referring to FIGS. 3 and 6, description will proceed to an updating operation of updating the RAM 27 when the CPU 25 receives, as an input signal, the outgoing call signal from the illustrated radio telephone set 11'. It should be noted that stages are numbered as a continuation of the first and the second stages S1 and S2 (FIG. 5) although the stages in FIG. 6 are not for the registration operation but for the updating operation.

It will be assumed that the illustrated radio telephone set 11' is present in the zone assigned to the illustrated radio communication device 15' and that the radio telephone set 11' transmits an outgoing call signal. The outgoing call signal comprises the dialing signal and the telephone number signal representative of the telephone number of the radio telephone set 11'.

At a third stage S3, the CPU 25 carries out judgement whether or not the input signal is the outgoing call signal with reference to the dialing signal. When the CPU 25 detects the dialing signal, the CPU 25 judges that the outgoing call signal is received. If the judgement gives an affirmative result, operation proceeds to a fourth stage S4. Otherwise, operation returns to the third stage S3.

At the fourth stage S4, the CPU 25 carries out judgement whether or not a location information signal indicative of the illustrated radio communication device 15' is already memorized in the RAM 27 in correspondence to the radio telephone set indicative of the number signal included in the outgoing call signal. In other words, the CPU 25 judges whether or not the RAM 27 already memorizes, in correspondence to the radio telephone set specified by the outgoing call signal, the location information signal indicative of the radio communication device through which the CPU 25 receives the outgoing call signal.

When the judgement results in an affirmative result, the fourth stage S4 is followed by a fifth stage S5. At the fifth stage S5, the matrix switch 20 connects between one of the secondary interfaces 22 and one of the primary interfaces 21 under the control of the CPU 25. The above-mentioned one of the secondary interfaces 22 is connected to the radio communication device 15'. The above-mentioned one of the primary interfaces 21 is connected to an extension line 10 which corresponds to the radio telephone set 11'. Between the radio telephone set 11' and the radio communication device 15', communication of the speech signal starts by the use of an idle channel selected among the communication channels in the manner known in the art.

When the result of the judgement of the fourth stage S4 is negative, the fourth stage S4 is followed by a sixth stage S6. At the sixth stage S6, the CPU 25 of the control unit 16 updates the RAM 27 to make the location information signal for the radio telephone set 11' indicate a different radio communication device assigned to the zone in which the illustrated radio telephone set 11' is present at the instant under consideration. More specifically, the CPU 25 updates the RAM 27 to make the location information signal for the radio telephone set 11' indicate the different radio communication device through which the CPU 25 of the control unit 16 receives the outgoing call signal.

The sixth stage S6 is succeeded by the fifth stage S5. At the fifth stage S5, the radio telephone set 11' is connected through the different radio communication device to an extension line 10 corresponding to the radio telephone set 11'. As a result, communication of the speech signal can start between the radio telephone set 11' and a called telephone set which is specified by the dialing signal of the outgoing call signal and is connected to the extension line 10 corresponding to the radio telephone set 11'.

In order to carry out the above-mentioned operation of the third to the sixth stages S3 to S6, the CPU 25 executes an outgoing call connection operation program memorized in another part (not shown) of the fourth area 34 of the ROM 26.

Figure 7:
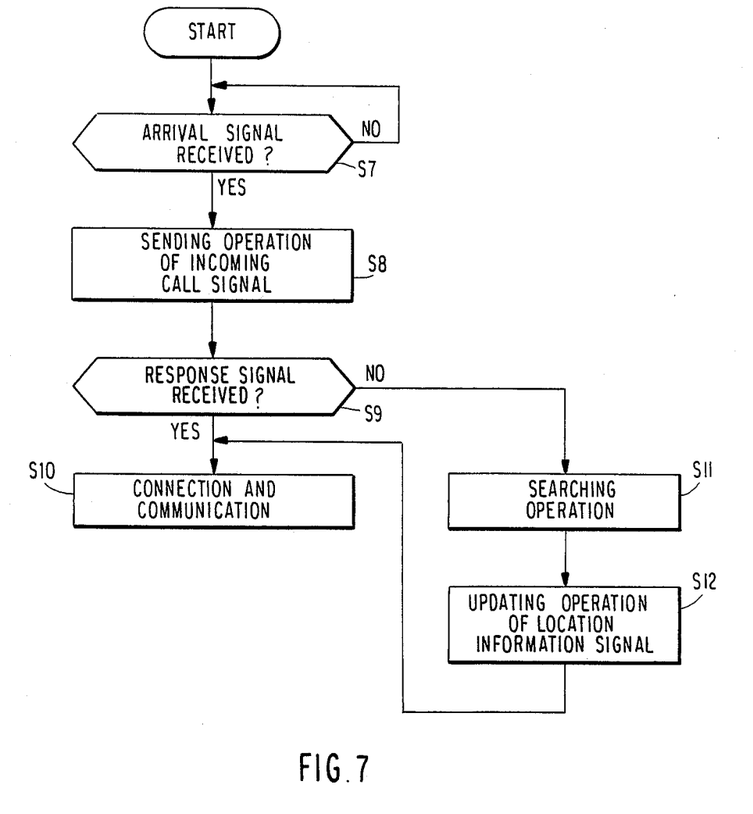

Turning to FIG. 7 and with reference to FIG. 3, description will proceed to operation of the control unit 16 in a case where the control unit 16 receives the arrival signal through one of the extension lines 10 as an input signal.

At a seventh stage S7, the CPU 25 of the control unit 16 judges whether or not the input signal is the arrival signal. More specifically, the CPU 25 carries out operation of detecting the arrival signal received from the above-mentioned one of the extension lines 10 through one of the primary interfaces 21. When the CPU 25 detects the arrival signal, operation proceeds to an eighth stage S8. Otherwise, operation turns back to the seventh stage S7.

At the eighth stage S8, the CPU 25 selects, as a specific telephone set, one of the radio telephone sets 11 that is specified by the above-mentioned one of the extension lines 10.

It will now be assumed that the specific telephone set is illustrated at 11' and that the RAM 27 memorizes, in correspondence to the specific telephone set 11', the location information signal indicative of the illustrated radio communication device 15'.

The CPU 25 furthermore selects, as a specific communication device, the illustrated radio communication device 15' indicated by the location information signal corresponding to the specific telephone set 11' with reference to the content of the RAM 27 as mentioned above.

The CPU 25 thereafter sends the arrival signal as the incoming call signal to the specific communication device 15' for transmission to the specific telephone set 11'. The incoming call signal comprises the call tone signal and the number signal representative of the telephone number of the specific telephone set 11'. The eighth stage S8 is followed by a ninth stage S9.

In order to carry out operation of a combination of the seventh and the eighth stages S7 and S8, the CPU 25 executes a combination of the arrival signal detecting operation and the incoming call signal sending operation programs memorized in the first and the second areas 31 and 32 of the ROM 26.

At the ninth stage S9, the CPU 25 carries out judgement whether or not the response signal is received within the predetermined time after transmission of the incoming call signal towards the specific telephone set 11'. As mentioned before, the specific telephone set 11' transmits the response signal to the specific communication device 15' in response to the incoming call signal for reception by the CPU 25 of the control unit 16 when the specific telephone set 11' is present in the zone assigned with the specific communication device 15'.

When the CPU 25 receives the response signal at the ninth stage S9, the ninth stage S9 is followed by a tenth stage S10. At the tenth stage S10, the matrix switch 20 connects between one of the primary interfaces 21 and one of the secondary interfaces 22 under control of the CPU 25. The above-mentioned on of the primary interfaces 21 is the primary interface connected to the extension line 10 at which the arrival signal arrives. The above-mentioned one of the secondary interfaces 22 is the secondary interface connected to the specific communication device 15'. Between the specific telephone set 11' and the specific communication device 15', communication of the speech signal starts by the use of an idle channel selected among the communication channels.

If the CPU 25 does not receive the response signal at the ninth stage S9, the ninth stage S9 is followed by an eleventh stage S11. At the eleventh stage S11, the CPU 25 searches a different one of the radio communication devices 15 as a searched communication device by successively transmitting the incoming call signal to the radio communication devices 15 in a predetermined order until the CPU 25 receives the response signal through the searched communication device. The eleventh stage S11 is followed by a twelfth stage S12.

At the twelfth stage S12, the CPU 25 updates the RAM 27 to make the location information signal corresponding to the specific telephone set 11' indicate the searched communication device instead of the specific communication device 15'.

In order to carry out the eleventh and twelfth stages S11 and S12, the CPU 25 executes the searching operation program memorized in the third area 33 of the ROM 26.

The twelfth stage S12 is followed by the tenth stage S10. At the tenth stage S10, the CPU 25 makes the matrix switch 20 connect between the connection line 17 connected to the searched communication device and the extension line 10 from which the CPU 25 receives the arrival signal. In this manner, the specific telephone set 11' can start communication with a calling telephone set connected to the extension line 10 in question through the searched communication device.

Figure 8:
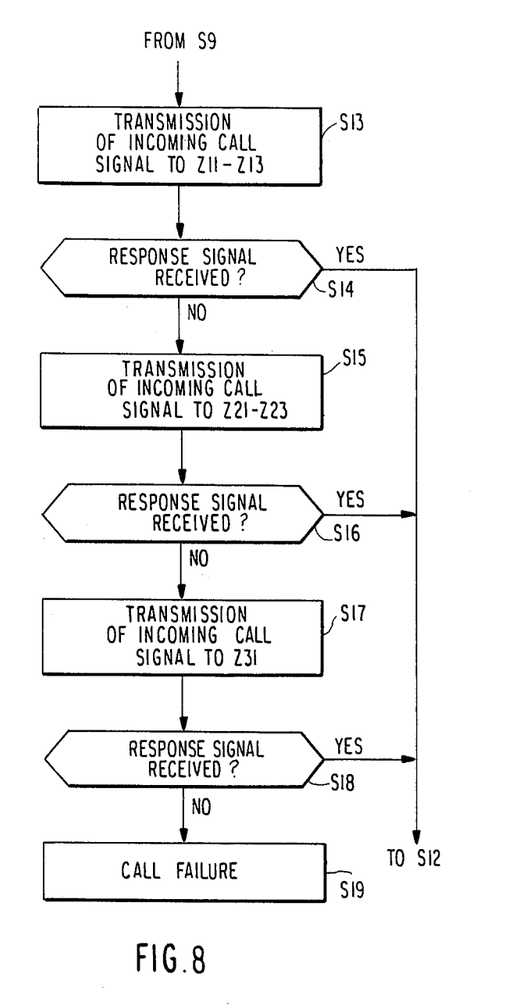

Referring to FIG. 8 afresh and FIG. 2 again, description will be made as regards a specific searching operation of the CPU 25 of the control unit 16 (FIG. 3). The specific searching operation is carried out instead of the searching operation of the eleventh and twelfth stages S11 and S12 described in conjunction with FIG. 7.

As mentioned before, the incoming call signal is transmitted to the specific telephone set by the use of the downward control channel of a predetermined radio frequency band, such as 380 MHz.

In FIG. 2, the service area 14 is divided into a predetermined number of zones Z (suffixes omitted). In the example being illustrated, the predetermined number is equal to seven. The predetermined number may be equal to or greater than three.

The zones Z are classified into at least two groups so that at least one of the groups consists of a plurality of the zones. In the example being illustrated, the zones Z are classified into three groups with the groups given individual numbers. That is, the groups will be referred to as first, second, and third groups. The first group consists of three zones Z11, Z12, and Z13. The second group consists of three zones Z21, Z22, and Z23. The third group consists of one zone Z31.

It should be noted here that the incoming call signal is never subjected to a radio interference, when transmitted from at least one of the radio communication devices 15 (FIG. 1) that is assigned to one of the zones of the first group, with a radio signal transmitted from another of the radio communication device 15 that is assigned to another of the zones of the first group.

The radio signal is transmitted from the radio communication device 15 by the use of the downward control channel. The radio signal is typically another incoming call signal. In this case, the incoming call signals are never subjected to radio interferences with one another, even when simultaneously transmitted from the radio communication devices 15 (FIG. 1) which are assigned to the zones Z11 to Z13 of the first group. Likewise, the incoming call signals are never subjected to radio interferences, when simultaneously transmitted from the radio communication devices 15 which are assigned to the zones Z21 to Z23 of the second group.

If the CPU 25 of the control unit 16 (FIG. 3) does not receive the response signal at the ninth stage S9 (FIG. 7), namely, when a negative result is obtained as a result of the judgement carried out at the ninth stage S9, operation proceeds to a thirteenth stage S13.

At the thirteenth stage S13, the CPU 25 searches the searched communication device by simultaneously transmitting the incoming call signal to the radio communication devices 15 assigned to the zones Z11 through Z13 of the first group.

The thirteenth stage S13 is followed by a fourteenth stage S14. At the fourteenth stage S14, the CPU 25 judges whether or not the response signal is received within a predetermined time after transmission of the incoming call signal towards the zones Z11 to Z13 of the first group. When the response signal is received, the fourteenth stage S14 is followed by the twelfth stage S12 described with reference to FIG. 7. When the response signal is not received by the CPU 25, the fourteenth stage S14 is followed by a fifteenth stage S15.

At the fifteenth stage S15, the CPU 25 searches the searched communication device by simultaneously transmitting the incoming call signal to the radio communication devices 15 assigned to the zones Z21 through Z23 of the second group.

The fifteenth stage S15 is followed by a sixteenth stage S16. At the sixteenth stage S16, the CPU 25 carries out judgement whether or not the response signal is received within the predetermined time after transmission of the incoming call signal towards the zones Z21 to Z23 of the second group. When a result of the judgement is affirmative, operation proceeds to the above-mentioned twelfth stage S12. Otherwise, operation proceeds to a seventeenth stage S17.

At the seventeenth stage S17, the CPU 25 searches the searched communication device by transmitting the incoming call signal to the radio communication device 15 assigned to the zone Z31 of the third group.

The seventeenth stage S17 is followed by an eighteenth stage S18 at which the CPU 25 judges whether or not the response signal is received within the predetermined time after transmission of the incoming call signal towards the zone Z31 of the third group. When the response signal is received, the eighteenth stage S18 is followed by the above-mentioned twelfth stage S12. When the response signal is not received, the eighteenth stage S18 is succeeded by a nineteenth stage S19 at which the CPU 25 judges that a call directed to the specific telephone set results in failure because the specific telephone set is not present within the service area.

With this searching operation, it is possible to search, for a short time, the specific or called telephone set 11' which happens to be out of position. This is because the searching operation is carried out by simultaneously transmitting the incoming call signal to a plurality of the radio communication devices 15.

While this invention has thus far been described in conjunction with a preferred embodiment thereof, it will readily be possible for those skilled in the art to put this invention into practice in various other manners. For example, the radio telephone sets may be installed in automobiles. In this instance, each radio telephone set may be either a video telephone or a terminal equipment of a digital communication network. Alternatively, each radio telephone set may be a pager receiver. In such events, the private branch exchange 13 should be an exchange for an automobile radio communication network or a radio pager receiver network. It should therefore be understood that such a radio device is an equivalent of the radio telephone set. The fact should moreover be noted that the device numbers are indicated in practice by the location information signals memorized in the RAM 27. It is therefore possible to understand that the location information signals are indicative of the zones directly rather than indirectly through the radio communication devices. In FIG. 7 or FIG. 8, the searching arrangement may search the searched communication device by transmitting the incoming call signal to the radio communication devices except the specific communication device in a predetermined manner.

What is claimed is:

1. For use in a mobile radio telephone network comprising a telephone line, a plurality of radio telephone sets movable in an area divided into a predetermined number of zones, and a plurality of radio communication devices assigned to the respective zones, a communication control system including:

a memory for memorizing, in correspondence to said radio telephone sets, location information signals indicative of the radio communication devices assigned to the zones in which said radio telephone sets are present at a time;

selecting means coupled to said telephone line and said memory for selecting, in response to an arrival signal arriving at said telephone line and specifying a specific telephone set among said radio telephone sets, one of said radio communication devices as a specific communication device that is indicated by one of said location information signals that, in turn, is in correspondence to said specific telephone set; and communicating means coupled to said radio communication devices and said selecting means for sending said arrival signal as a call signal to said specific communication device for transmission to said specific telephone set, said specific telephone set transmitting a response signal to said specific communication device in response to said call signal for reception by said communicating means when said specific telephone set is present in one of said zones that is assigned with said specific communication device; and searching means coupled to said radio communication devices and said communicating means for searching a different one of said radio communication devices as a searched communication device by transmitting, if said communicating means does not receive said response signal, said call signal to said radio communication devices in a predetermined manner until said communicating means receives said response signal through said searched communication device.

2. A communication control system as claimed in claim 1, wherein said searching means is furthermore for updating said memory to make said one of the location information signals indicate said searched communication device instead of said specific communication device.

3. A communication control system as claimed in claim 1, said call signal being transmitted to said specific telephone set in a predetermined radio frequency band, wherein:

said zones are classified into a plurality of groups, equal in number to a preselected number which is not less than two and not greater than said predetermined number less one, with said groups given individual numbers, so that at least one of said groups consists of at least two of said zones and that said call signal is never subjected to a radio interference, when transmitted from at least one of said radio communication devices that is assigned to one of the zones of said at least one of the groups, with a radio signal transmitted from another of said radio communication devices that is assigned to another of the zones of said at least one of the groups;

said searching means being for searching said searched communication device, if said communicating means does not receive said response signal, by transmitting said call signal at first simultaneously to the radio communication devices which are assigned to the zones of said at least one of the groups, said searching means transmitting said call signal subsequently to at least one remaining communication device of said radio communication devices that is assigned to the zone of at least one remaining group of said groups with said groups selected in an order predetermined relative to said individual numbers.

4. A communication control system as claimed in claim 3, wherein said preselected number is equal to two.

* * * * *

UNITED STATES PATENT AND TRADEMARK OFFICE
CERTIFICATE OF CORRECTION

PATENT NO. : 4,843,622

DATED : June 27, 1989

INVENTOR(S) : Yotsutani et al

It is certified that error appears in the above-identified patent and that said Letters Patent is hereby corrected as shown below:

Column 2, line 43, delete "ar" and insert --are--.

Column 3, line 56, delete "on" and insert --one--.

Column 7, line 30, delete "on" and insert --one--.

Column 11, line 49, delete "on" and insert --one--.

Signed and Sealed this

Twenty-eighth Day of August, 1990

Attest:

HARRY F. MANBECK, JR.

*Attesting Officer*  *Commissioner of Patents and Trademarks*